J. F. HUTCHINSON.
HAY LOADER.
APPLICATION FILED JULY 3, 1915.

1,220,339.

Patented Mar. 27, 1917.
3 SHEETS—SHEET 1.

Witnesses
E. R. Ruppert.

Inventor
Jacob F. Hutchinson
By Victor J. Evans
Attorney

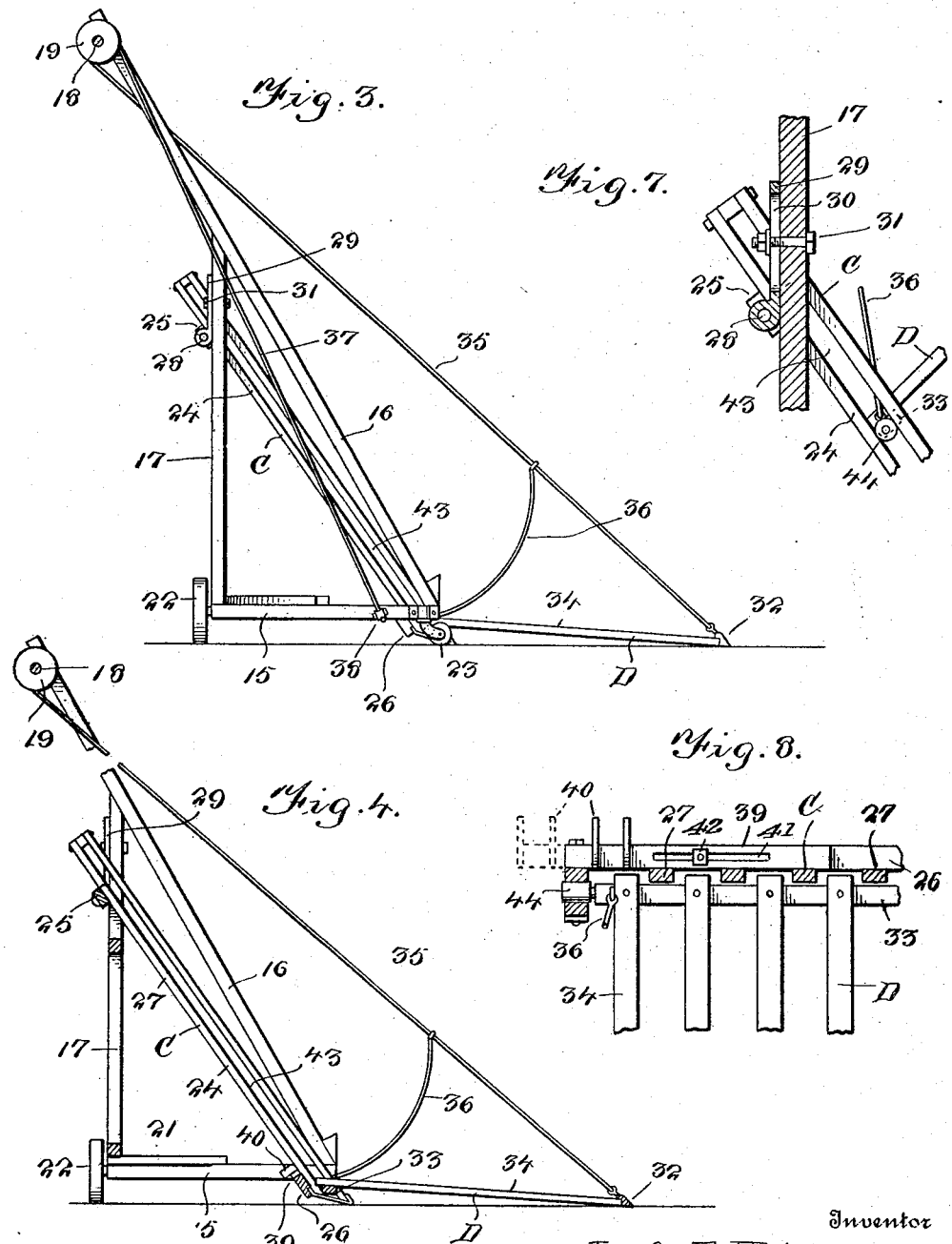

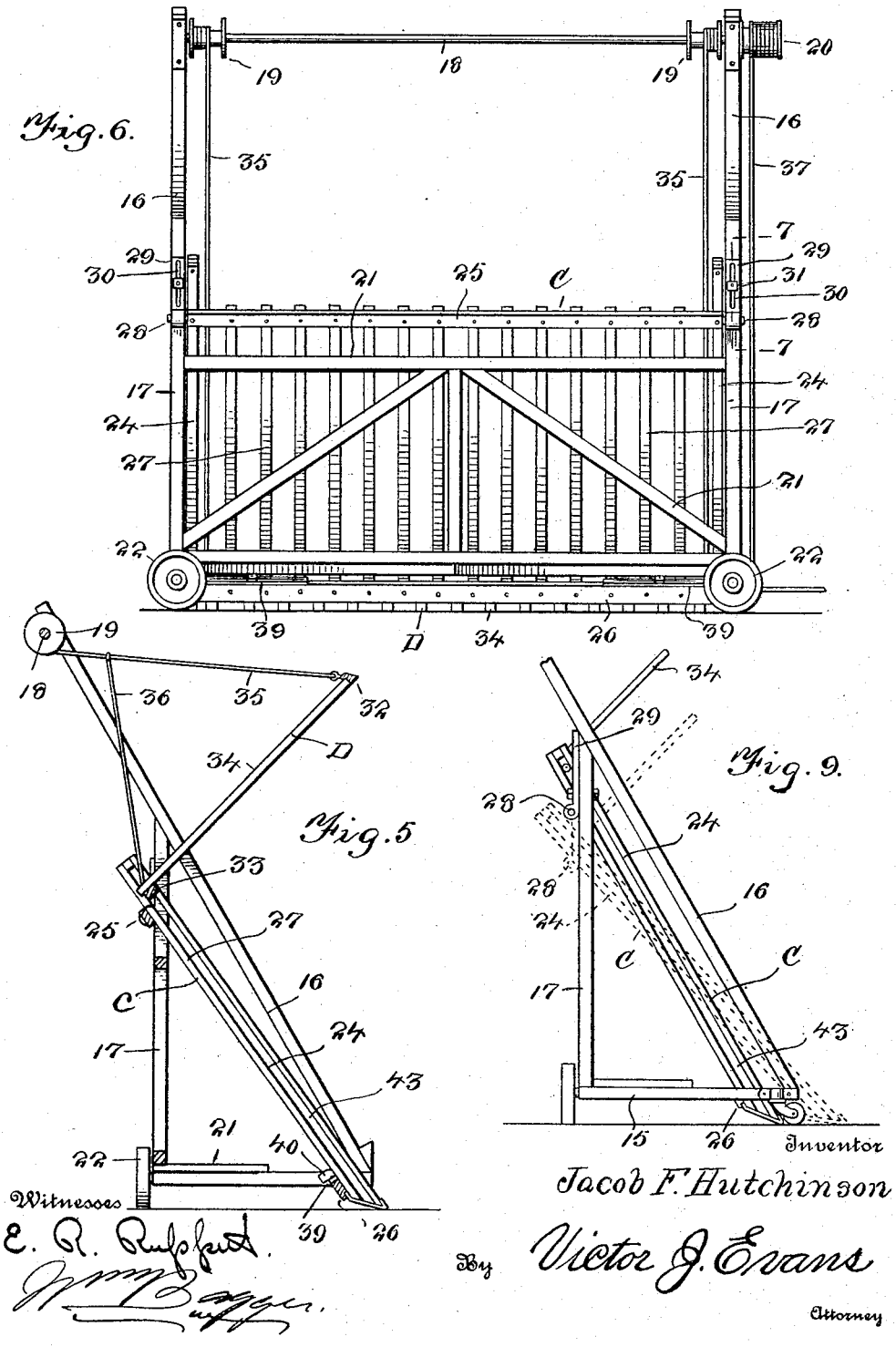

UNITED STATES PATENT OFFICE.

JACOB F. HUTCHINSON, OF SPRINGVILLE, UTAH.

HAY-LOADER.

1,220,339. Specification of Letters Patent. Patented Mar. 27, 1917.

Application filed July 3, 1915. Serial No. 37,984.

*To all whom it may concern:*

Be it known that I, JACOB F. HUTCHINSON, a citizen of the United States, residing at Springville, in the county of Utah and State of Utah, have invented new and useful Improvements in Hay-Loaders, of which the following is a specification.

This invention relates to hay loaders and it has particular reference to a device for loading hay on wagons or hay racks in the field, the object being to prevent the necessity of a long haul with the gathering rake.

A further object of the invention is to produce a simple and improved hay loading device on which hay may be deposited by the gathering rake and by means of which the hay may be elevated and deposited on the rack or wagon.

A further object of the invention is to produce a simple and improved hay loading device which may be readily adjusted to operate in connection with racks or wagons of different heights.

With these and other ends in view which will appear as the nature of the invention is better understood, the same consists in the improved construction, arrangement and combination of parts which will be hereinafter more fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the appended claims may be resorted to when desired.

In the drawings:—

Fig. 3 is a side view showing the device in position to receive a load.

Fig. 4 is a vertical sectional view taken on the line 4—4 in Fig. 1.

Fig. 5 is a vertical sectional view similar to Fig. 4 showing the carrier in discharging position.

Fig. 6 is a rear view.

Fig. 7 is a sectional detail view taken on the line 7—7 in Fig. 6, vertically through the adjusting block.

Fig. 8 is a horizontal sectional view taken on the line 8—8 of Fig. 1.

Fig. 9 is a diagrammatic view showing different positions of the device when used for loading racks of different heights.

Corresponding parts in the several figures are denoted by like characters of reference.

Figure 1:
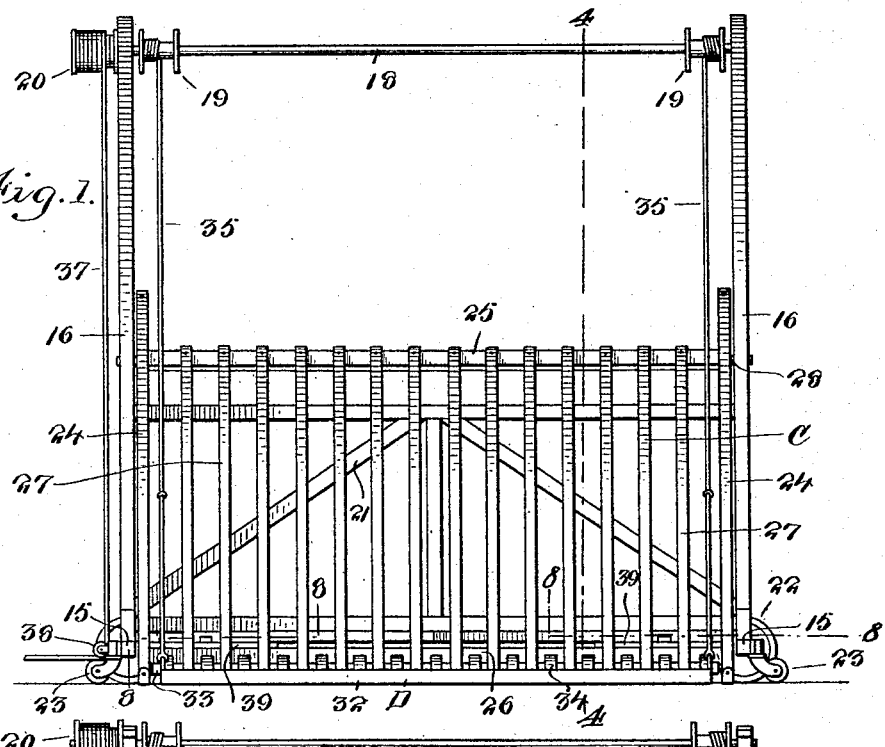
Figure 1 is a front view of a loading apparatus constructed in accordance with the invention.
Figure 2:
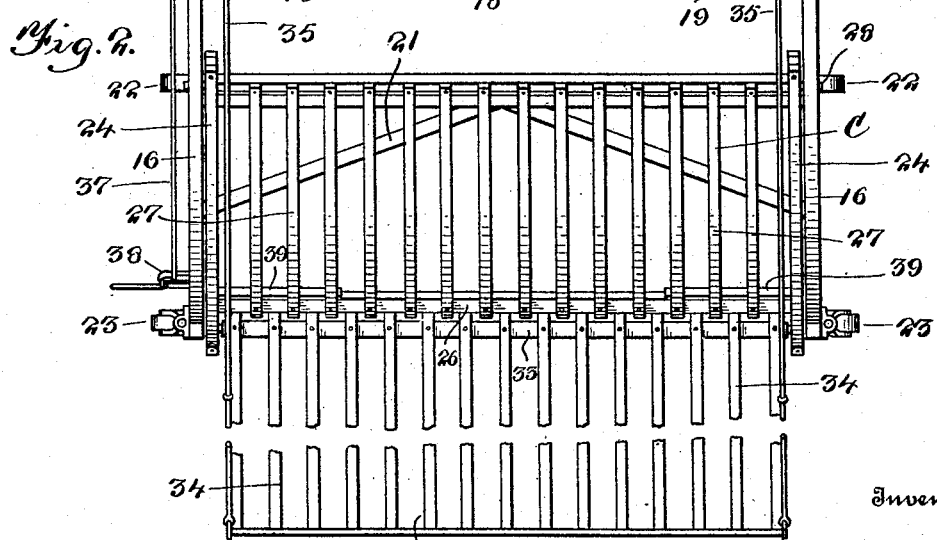
Fig. 2 is a top plan view of the same.

The main frame of the improved device includes the sills 15, inclined uprights 16, the lower ends of which are connected with the front ends of the sills with respect to which said uprights extend upwardly and rearwardly, and vertical braces 17, the lower ends of which are connected with the rear ends of the sills, the upper ends of said braces being connected with the uprights 16 below the upper ends of the latter, said inclined uprights being thereby supported and reinforced. The upper ends of the uprights 16 afford bearing for a shaft 18 carrying drums 19 and a pulley 20. The frame is reinforced by means of suitably arranged braces 21 and said frame is supported by means of ground wheels 22 adjacent to the rear ends of the sills and caster wheels 23 adjacent to the front ends of the sills for convenience in moving and turning the frame and the parts supported by said frame.

C designates an inclined guide frame, said frame being composed of side members 24 which are connected together and spaced apart near their upper ends by a cross bar 25 and at their lower ends by a cross bar 26, said cross bars being connected together by slats or bars 27. The side members 24 are provided at their upper ends with laterally extending pivot members or trunnions 28 for which bearings are provided at the lower ends of blocks or slides 29 which are adjustably mounted on the rear sides of the uprights 17, each of said slides being provided with a longitudinal slot 30 for the reception of a fastening member such as a screw or bolt 31 whereby it is adjustably connected with the upright 17. The lower end of the frame C rests loosely on the ground between the forward ends of the sills 15, and it will be noticed that by raising and lowering the blocks, or slides 29, the inclination of said frame with respect to the surface of the ground may be varied.

A lifting frame or carrier D is provided, the said carrier being composed of front and rear cross bars 32, 33, said cross bars being connected together and spaced apart by means of slats 34 that extend through the interspaces between the slats 27 of the inclined guide frame C. When in load receiving position the carrier D lies substantially flat on the ground, the rearward ends of the slats 34 being raised above the ground only by the thickness of the cross bar 33. It may here be stated that the purpose of providing for variation in the inclination of the frame C is to fit the device for coöperation with hay racks of different heights, it being obvious that by varying the inclination of the frame the upper end of said frame will move in an arc about the axis of the bottom bar 26 which rests on the ground, thereby raising or lowering the top bar 25 according to the height of the rack or wagon that is to be loaded.

Flexible hoisting elements such as ropes 35 are connected with and adapted to be wound on the drums 19, the lower ends of said ropes being connected with the front corners of the carrier D. Slack ropes 36 connect the ropes 35 with the rearward corners of the carrier, said slack ropes being connected with the hoisting ropes 35 at a moderate distance from the front corners of the carrier. Connected with and wound on the pulley 20 is a draft rope 37, said rope being guided over a pulley 38 connected with one of the sills of the frame. It is obvious that by exerting a draft strain on the rope 37 it will be unwound from the pulley 20 causing the hoisting ropes 35 to be wound on the drums 19. Assuming a load of hay to have been previously placed on the carrier, the latter will be tilted, slightly compressing the load between itself and the inclined guide frame, this tilting movement continuing until the slack ropes 36 have become taut when the frame D carrying the load will be lifted, the load sliding along the slats 27 of the frame C until the upper end of the latter has been reached, when the load will slide over the upper end of the guide frame to the wagon box or rack that is to be loaded.

Fitted on the upper edge of the cross bar 26 of the frame C are clamp members consisting of slides 39 each provided at one end with rearwardly extending arms 40, said slides being each provided with a slot 41 engaged by a bolt 42 whereby it may be secured in position, see Fig. 8. When the device is being transported over the ground it is obvious that the frame C, the lower end portion of which rests on the ground when the machine is in operation, must be lifted to a position where it will not engage the ground. When the said frame is raised the lower end thereof may be swung rearwardly until the arms 40 of the slides 39 engage the uprights 17 of the main frame, when, by moving the slides, one arm of each slide may be frictionally engaged with one of the uprights so as to maintain the frame C in raised position with sufficient security, while the machine is being moved from place to place. The side member 24 of the inclined guide frame may be provided with slots 43 adapted to receive guide rollers 44 associated with the carrier frame D, such construction serving to avoid undue friction, thus facilitating and improving the operation of the device.

From the foregoing description taken in connection with the drawings hereto annexed, the operation and advantages of this invention will be readily understood by those skilled in the art to which it appertains.

The load that is to be lifted may be deposited on the carrier frame or platform D by any gathering rake such as a bull rake of well-known conventional construction.

The machine may be quickly and easily moved to any convenient place in the field, thereby avoiding long hauls with the loaded gathering rakes, and it may be quickly and easily adjusted to operating connection with hay racks or wagons of different heights. For the purpose of operating the improved loader, animal power may be employed, the draft being simply hitched to the draft rope 37. It is obvious, however, that within the scope of the invention the draft rope may be connected with a power driven winding drum or reel and adapted to be wound thereon. After a load has been discharged from the carrier D, the latter will gravitationally descend to its initial or receiving position when the draft strain on the rope 37 is released.

Having thus described the invention what is claimed is:—

1. In a loading apparatus of the class described, a main frame, a guide frame supported in an inclined position, said guide frame having spaced slats, and a lifting platform having spaced slats engaging the interspaces between the slats of the guide frame.

2. In a loading apparatus of the class described, a main frame having transporting wheels, sills and uprights, an inclined guide frame connected adjustably at its upper end with the uprights of the main frame and having its lower end normally supported on the ground between the sills, and clamp means carried by the guide frame and adapted to engage the uprights of the main frame when the guide frame is raised from the ground for transportation of the machine.

3. In a loading apparatus of the class described, a main frame, an inclined guide frame connected therewith, said guide frame being relatively stationary, and a movably supported carrier frame, said guide frame and carrier frame having spaced slats, the slats of each frame engaging the interspaces between the slats of the other frame.

4. In a loading apparatus, a main frame including inclined uprights and vertical props, a shaft mounted for rotation in the upper ends of the uprights, an inclined guide frame, a movably supported carrier frame, drums carried by the shaft, cables connecting said drums with the forward corners of the carrier frame, slack ropes connecting said cables with the rearward corners of the carrier frame, and means for rotating the drum carrying shaft.

In testimony whereof I affix my signature in presence of two witnesses.

JACOB F. HUTCHINSON.

Witnesses:
WALLACE MACE,
M. A. CONANT.

Copies of this patent may be obtained for five cents each, by addressing the "Commissioner of Patents, Washington, D. C."